United States Patent
Tang et al.

(10) Patent No.: US 7,394,861 B1
(45) Date of Patent: Jul. 1, 2008

(54) APPARATUS FOR GENERATING SIGNAL GAIN COEFFICIENTS FOR A SIMO/MISO TRANSCEIVER FOR PROVIDING PACKET DATA COMMUNICATION WITH A SISO TRANSCEIVER

(75) Inventors: Haiyun Tang, Saratoga, CA (US); Karim Toussi, Belmont, CA (US); Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 661 days.

(21) Appl. No.: 10/818,147

(22) Filed: Apr. 5, 2004

(51) Int. Cl.
*H04B 7/02* (2006.01)
(52) U.S. Cl. .................................................. 375/267
(58) Field of Classification Search ................ 375/267, 375/347, 349; 700/53; 455/101, 132–141
See application file for complete search history.

(56) References Cited

U.S. PATENT DOCUMENTS

| 6,185,258 | B1 | 2/2001 | Alamouti et al. | |
| 6,879,642 | B2 * | 4/2005 | Taskinen | 375/302 |
| 7,245,677 | B1 * | 7/2007 | Pare, Jr. | 375/344 |
| 2003/0020651 | A1 * | 1/2003 | Crilly et al. | 342/378 |
| 2003/0235147 | A1 * | 12/2003 | Walton et al. | 370/204 |

OTHER PUBLICATIONS

Haller, "Algorithms and VLSI Architectures for RLS-Based Time Reference Beamforming in Mobile Communications", IEEE 1998, p. 29-36.*
U.S. Appl. No. 10/818,061, filed Apr. 5, 2004, Tang et al.
U.S. Appl. No. 10/818,151, filed Apr. 5, 2004, Tang et al.

* cited by examiner

*Primary Examiner*—Sam K. Ahn
(74) *Attorney, Agent, or Firm*—Vedder Price P.C.

(57) ABSTRACT

Apparatus and method for generating signal gain coefficients for use in packet data communication between a single-input-single-output (SISO) transceiver and a single-input-multiple-output/multiple-input-single-output (SIMO/MISO) transceiver. Coordinate rotation digital computation (CORDIC) techniques are used to generate transmit channel coefficients which are substantially complementary to receive channel coefficients representing relative strengths of individual signals received via multiple spatially diverse antenna elements and corresponding to a wireless data signal originating from a particular SISO radio frequency (RF) transceiver. Using such transmit channel coefficients to produce outgoing RF signals for transmission via the same antenna elements and reception by such particular SISO RF transceiver provides for signal transmission and reception diversity.

16 Claims, 10 Drawing Sheets

| PROFILE INDICES | SOURCE MAC ADDRESSES | 1602 |
|---|---|---|
| 0 | | |
| 1 | | |
| 2 | | |
| 3 | | |
| ⋮ | | |
| 28 | | |
| 29 | | |
| 30 | | |
| 31 | | |
| ↑ 1604 | ↑ 1606 | |

FIG. 16

APPARATUS FOR GENERATING SIGNAL GAIN COEFFICIENTS FOR A SIMO/MISO TRANSCEIVER FOR PROVIDING PACKET DATA COMMUNICATION WITH A SISO TRANSCEIVER

BACKGROUND OF THE INVENTION

1. Field of the Invention

The present invention relates to methods to implement a transmit diversity architecture for wireless packet data communications systems, such as those conforming to the IEEE 802.11a/g standards.

2. Description of the Related Art

Wireless communication system performance depends heavily on the radio propagation environment. For example, in a simplified two-dimensional radio propagation environment, such as a typical office environment, radio signal obstacles are represented as one-dimensional walls with certain transmission and reflection coefficients. The radio signal propagation environment between the transmitter and receiver is called a channel. Due to wall transmissions and reflections, multiple replicas of the original signal transmitted by the transmitter are received. The replicas have different amplitudes and arrival times, resulting in different channel frequency responses.

Such behavior is called frequency selective multipath fading and is typical in multipath channels. In an OFDM (orthogonal frequency division multiplexed) system, data is modulated on narrowband subcarriers. For example, IEEE 802.11a/g uses 64 narrowband subcarriers over a 20 MHz range. Because of multipath fading, each subcarrier experiences a different channel frequency response. Those subcarriers with response dips would experience lower channel gains resulting in data loss on those subcarriers.

There are different ways to mitigate the effect of multipath fading. One way is through frequency diversity where the data is spread across multiple carriers so that the deep fades on some of subcarriers can be offset by gains on other subcarriers. Another method uses spatial diversity to mitigate multipath fading. In this latter method, the transceiver uses multiple antennas (in the form of an antenna array) and RF front-ends and combines the signals from different antenna branches to mitigate multipath fading.

SUMMARY OF THE INVENTION

In accordance with the presently claimed invention, an apparatus and method generate signal gain coefficients for use in packet data communication between a single-input-single-output (SISO) transceiver and a single-input-multiple-output/multiple-input-single-output (SIMO/MISO) transceiver. Coordinate rotation digital computation (CORDIC) techniques are used to generate transmit channel coefficients which are substantially complementary to receive channel coefficients representing relative strengths of individual signals received via multiple spatially diverse antenna elements and corresponding to a wireless data signal originating from a particular SISO radio frequency (RF) transceiver. Using such transmit channel coefficients to produce outgoing RF signals for transmission via the same antenna elements and reception by such particular SISO RF transceiver provides for signal transmission and reception diversity.

In accordance with one embodiment of the presently claimed invention, an apparatus for generating signal gain coefficients for a single-input-multiple-output/multiple-input-single-output (SIMO/MISO) transceiver for providing packet data communication with a single-input-single-output (SISO) transceiver includes a plurality of signal terminals, input coordinate rotation digital computation (CORDIC) circuitry and normalization circuitry. The plurality of signal terminals is for conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver. The input CORDIC circuitry is coupled to the plurality of signal terminals and responsive to the plurality of input signals by providing a plurality of input magnitude signals and a plurality of input phase signals representing pluralities of magnitudes and phases, respectively, of polar coordinates for the plurality of receiver channel gain coefficients. The normalization circuitry is coupled to the input CORDIC circuitry and responsive to at least a portion of the plurality of input magnitude signals by providing a plurality of normalized signals representing a plurality of normalized magnitudes of the polar coordinates for the plurality of receiver channel gain coefficients.

In accordance with another embodiment of the presently claimed invention, an apparatus for generating signal gain coefficients for a single-input-multiple-output/multiple-input-single-output (SIMO/MISO) transceiver for providing packet data communication with a single-input-single-output (SISO) transceiver includes signal means, input coordinate rotation digital computer (CORDIC) means and normalizing means. The signal means is for conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver. The input CORDIC means is for responding to the plurality of input signals by generating a plurality of input magnitude signals and a plurality of input phase signals representing pluralities of magnitudes and phases, respectively, of polar coordinates for the plurality of receiver channel gain coefficients. The normalizing means is for responding to at least a portion of the plurality of input magnitude signals by generating a plurality of normalized signals representing a plurality of normalized magnitudes of the polar coordinates for the plurality of receiver channel gain coefficients.

In accordance with still another embodiment of the presently claimed invention, a method of generating signal gain coefficients for a single-input-multiple-output/multiple-input-single-output (SIMO/MISO) transceiver for providing packet data communication with a single-input-single-output (SISO) transceiver includes:

conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver;

performing coordinate rotation digital computation in response to the plurality of input signals to generate a plurality of input magnitude signals and a plurality of input phase signals representing pluralities of magnitudes and phases, respectively, of polar coordinates for the plurality of receiver channel gain coefficients; and responding to at least a portion of the plurality of input magnitude signals by generating a plurality of normalized signals representing a plurality of normalized magnitudes of the polar coordinates for the plurality of receiver channel gain coefficients.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
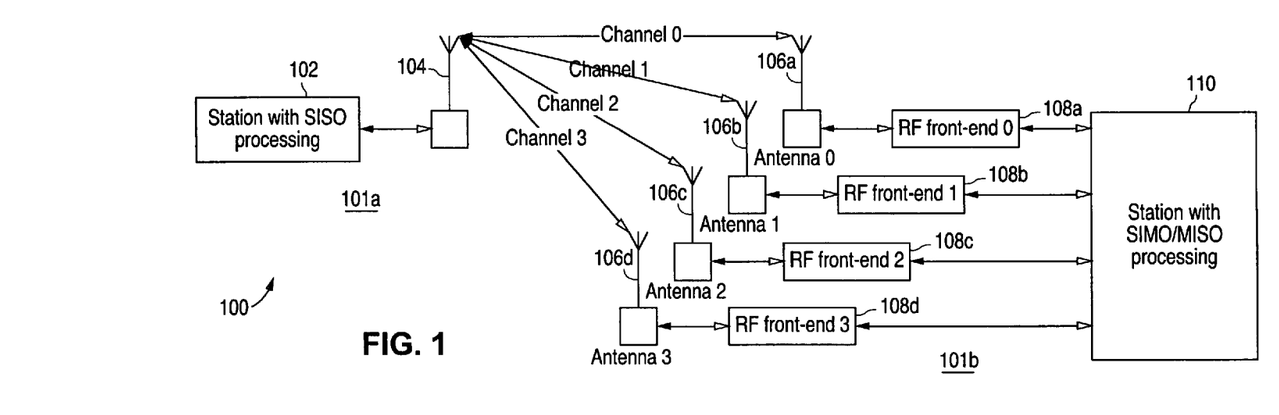
FIG. 1 shows a proposed SIMO/MISO system that contains a SISO station and a MISO station.

In commonly assigned, copending U.S. patent application Ser. No. 10/818,151, filed on even date herewith, and entitled "SIMO/MISO Transceiver For Providing Packet Data Communication With SISO Transceiver" (the contents of which are incorporated herein by reference), a baseband SIMO/MISO architecture is proposed to improve IEEE 802.11a/g system performance. The proposed SIMO/MISO system is shown in FIG. 1, which includes a SISO station 102 and a SIMO/MISO station 110 where multipath antennas 106 and RF front-ends 108 are used. In a typical scenario, the SISO station 102 will initiate an uplink packet transfer to the SIMO/MISO station as indicated by the empty arrows. The SIMO/MISO station 110 will perform channel estimation, SIMO combining, as well as the computation of the MISO gain coefficients. Upon successful reception of the packet, an association is established between the computed MISO gain coefficients and the MAC address of the particular SISO station. For the downlink packet transfer from the SIMO/MISO station 110 to the SISO station 102, in the direction indicated by the filled arrows, the MISO gain coefficients associated with the SISO station 102 will be used to scale the baseband signals sent to different RF front-ends 108 and antennas 106. The RF signals from different antennas 106 will be combined over-the-air at the SISO station 101a resulting in a higher channel gain and thus improved performance.

Figures 2, 2A:
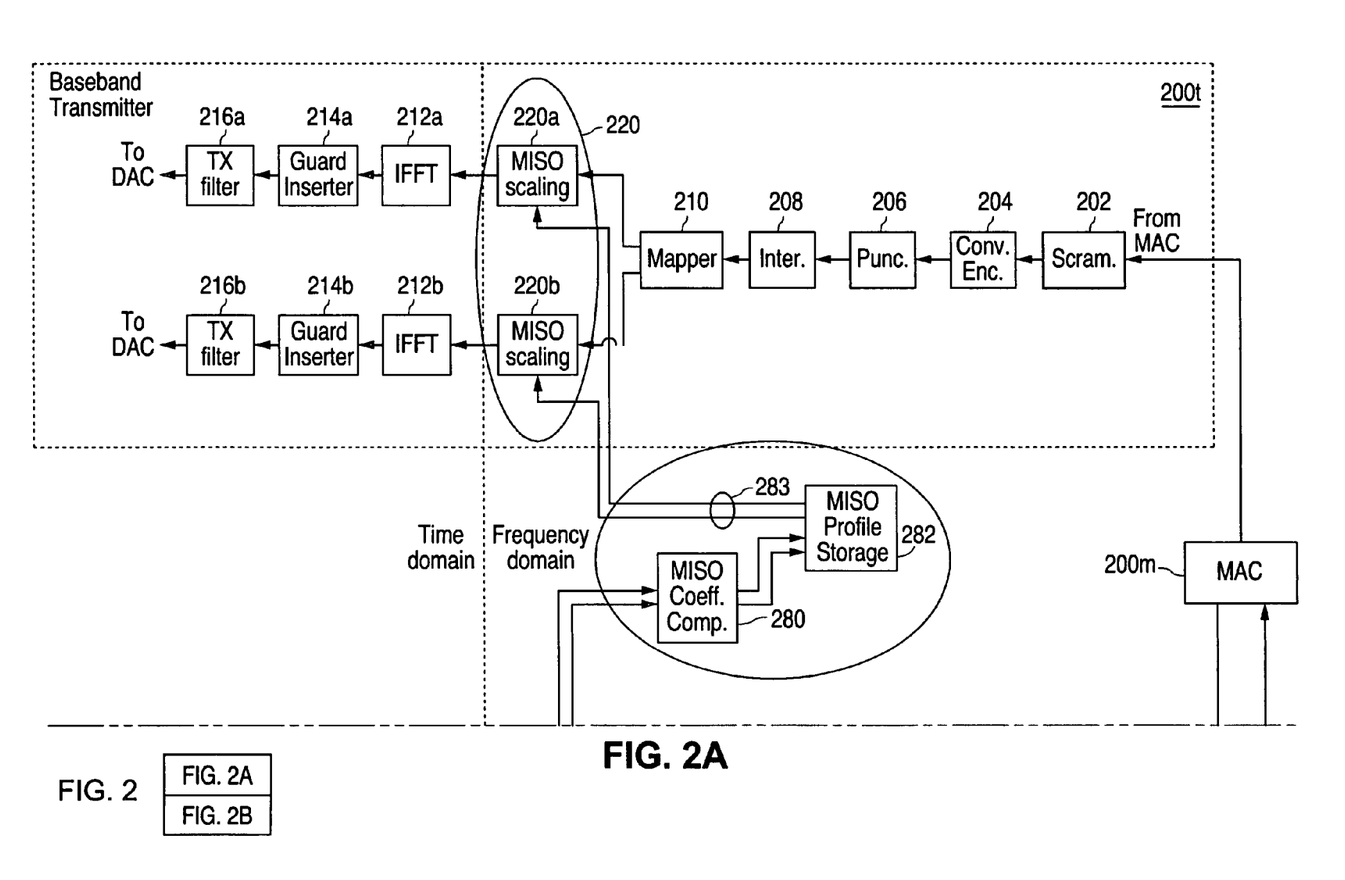
FIG. 2 shows a block-level implementation of a SIMO/MISO IEEE 802.11a/g transceiver.
Figure 2B:
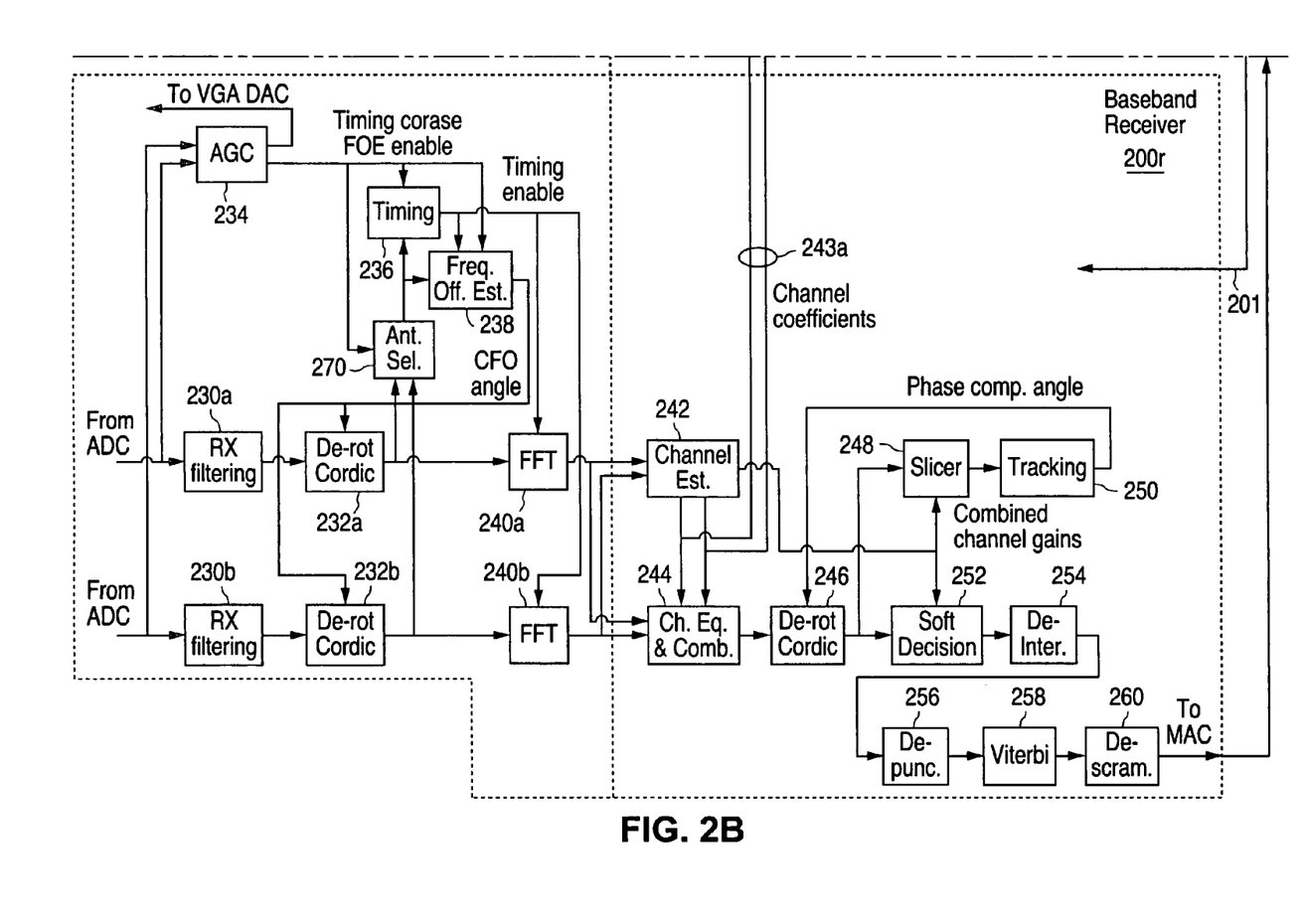

The baseband block diagram for a proposed IEEE 802.11a/g SIMO/MISO transceiver is shown in FIG. 2. For simplicity of illustration, only two antenna branches are used. The extension to more antenna branches is straightforward.

We first briefly discuss the mathematical operation to be performed for the MISO processing. (For a more detailed discussion, please refer to the aforementioned U.S. patent application entitled "SIMO/MISO Transceiver For Providing Packet Data Communication With SISO Transceiver", the contents of which are incorporated herein by reference.) In the MISO operation, for each subcarrier k and antenna branch i, the MISO gain coefficient is computed as $$G_i(k) = \frac{C_i^*(k)}{\sqrt{|C_1(k)|^2 + |C_2(k)|^2 + \ldots + |C_M(k)|^2}} \quad (1)$$

where $C_i(k)$ is the channel frequency response on antenna i and subcarrier k and $G_i(k)$ is the MISO gain coefficient. During transmission, the MISO gain coefficients will be used to scale frequency domain data $$X_i(k) = G_i(k)X(k) \quad (2)$$

Referring to FIG. 2, the Channel Estimation module 242 estimates the channel coefficients $C_i(k)$. Using the channel coefficients, the MISO gain coefficients are computed by the MISO Coefficient Computation module 280 according to Equation 1 and then stored in the MISO profile storage 282. During transmission, the stored MISO coefficients are used to scale the Mapper 210 output according to Equation 2 and the scaling is performed by the MISO scaling module 220.

The computation of Equation 1 involves division and square root, neither of which has a simple hardware implementation. In accordance with the presently claimed invention, a novel CORDIC-based approach performs the mathematical operation as expressed in Equation 1. (CORDIC stands for Coordinate Rotation Digital Computation and is a well-known technique to perform Cartesian-to-Polar coordinate conversion.) Through successive rotation with incrementally decreasing steps, CORDIC can perform conversion between the Cartesian and Polar coordinates with arbitrary precision.

There are usually two kinds of CORDICs that are in common use. One kind of CORDIC performs the Cartesian-to-Polar conversion, which we will call CORDIC Mag. The other kind of CORDIC rotates an Cartesian input by certain angle, which we call CORDIC Rot. Mathematically, the CORDIC Mag performs the operation $$(x,y) \rightarrow (R,A) \qquad (3)$$

Here x and y are fixed-point representation the Cartesian coordinates and R and A are fixed-point representation of the Polar coordinates and $$R = \sqrt{x^2 + y^2}, \qquad (4)$$

$$A = \arctan\frac{y}{x} \qquad (5)$$

Given angle $A_r$, the CORDIC Rot performs the operation $$(x,y) \rightarrow (x_r, y_r) \qquad (6)$$

where the new coordinates $(x_r, y_r)$ has the Polar representation $(R, A-A_r)$.

Figure 3:
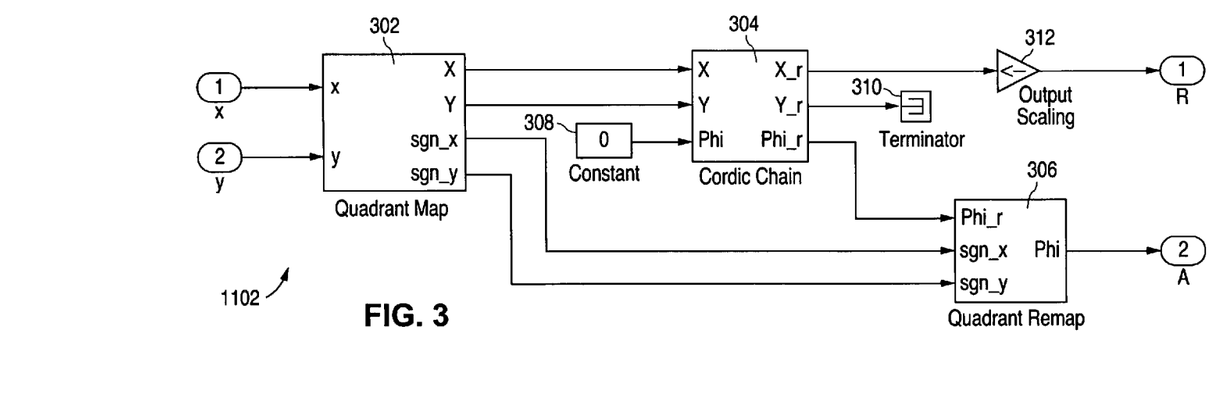
FIG. 3 shows a block-level implementation of a CORDIC Mag module.
Figure 4:
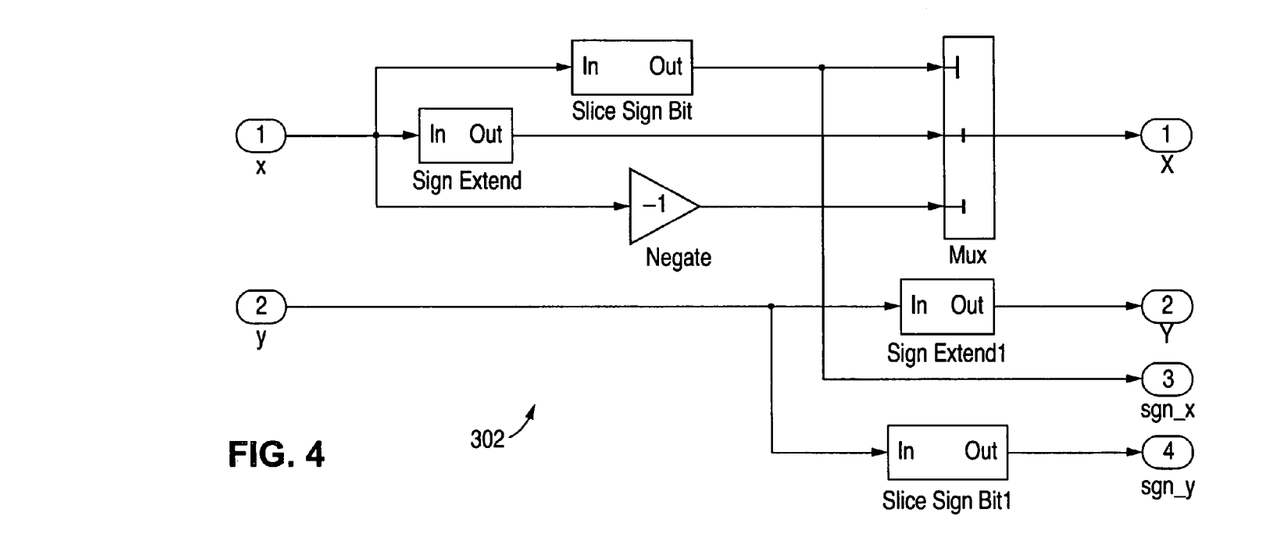
FIG. 4 shows a implementation of CORDIC Mag Quadrant Map module.
Figure 5:
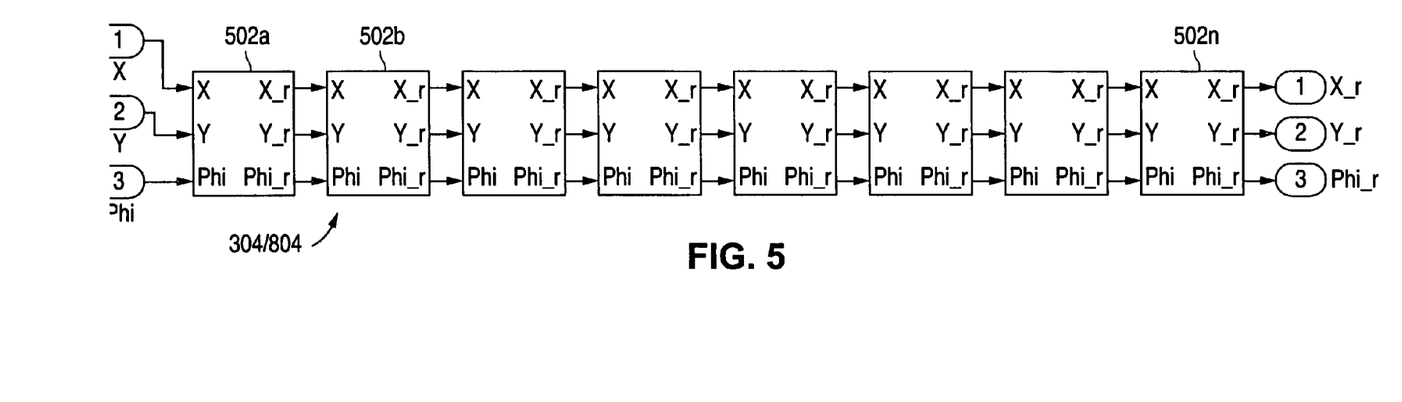
FIG. 5 shows an implementation of CORDIC Mag CORDIC Chain module.
Figure 6:
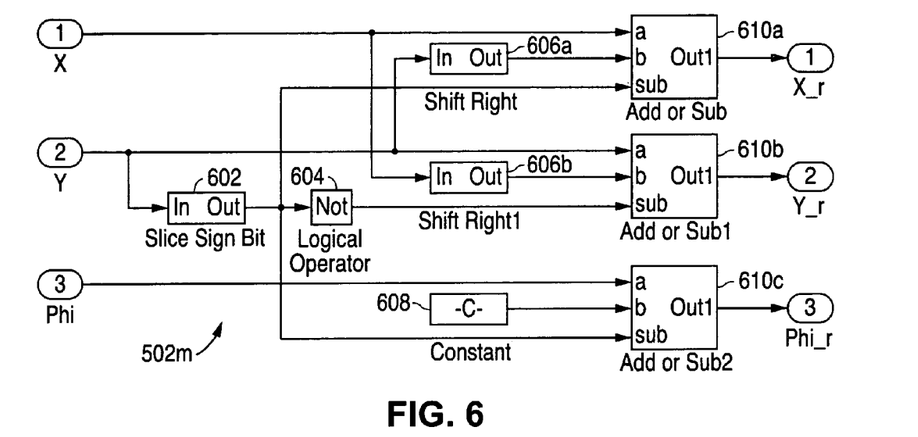
FIG. 6 shows an example implementation on one stage of the CORDIC Mag CORDIC Chain module.
Figure 7:
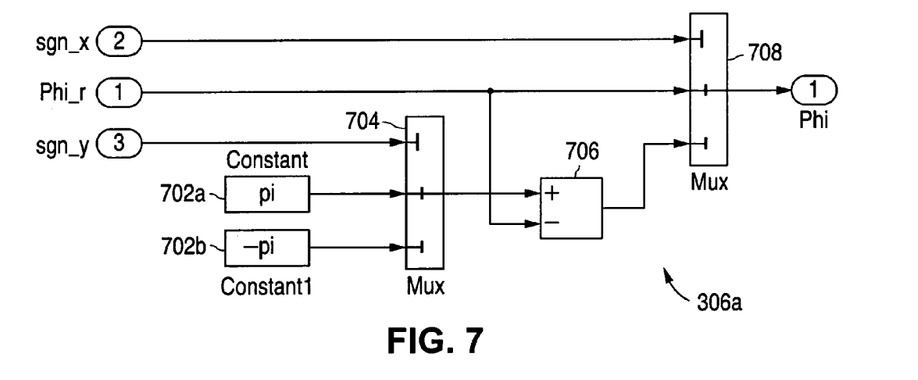
FIG. 7 shows an implementation of CORDIC Mag Quadrant Remap module.

FIGS. 3-7 show the detailed implementation 1102 of CORDIC Mag. Although it is a well-known technique, an overview is nonetheless provided here. FIG. 3 shows the top level view of CORDIC Mag implementation 1102 which takes Cartesian input coordinates x and y and outputs polar coordinates R and A. The Quadrant Map module 302, as shown in detail in FIG. 4, maps the inputs from the second and third quadrants into the first and fourth quadrants, respectively, since the internal CORDIC Chain 304 only handles first and fourth quadrant inputs. FIG. 5 shows the CORDIC Chain 304 which contains a number of similar stages 502. Usually the addition of one stage increases the angle estimation accuracy by 1 bit. Depending on the accuracy needed, one may choose the number of stages needed. A single CORDIC Chain stage 502m, shown in FIG. 6, rotates the input clockwise or counterclockwise with a small angle depending on the sign of input vertical coordinate Y. Because the rotation angle is progressively smaller with each additional stage 502, the estimation becomes more and more accurate. Once the estimation is done, the angle needs to be remapped to the second and third quadrants if the input had previously been mapped to the first and fourth quadrants, respectively. This is achieved by the Quadrant Remap module 306 shown in FIG. 7. The rotation process intrinsically scales the magnitude output from the CORDIC Chain 304, i.e., X_r, which needs to be scaled down for the final output by an output scaler 312.

Figure 8:
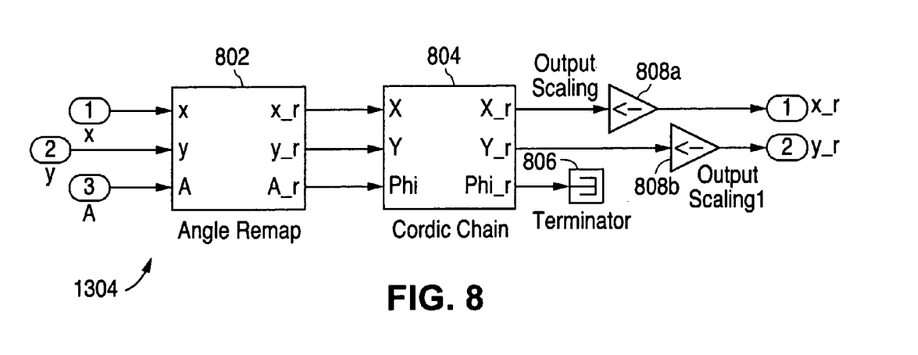
FIG. 8 shows a block-level implementation of a CORDIC Rot module.
Figure 9:
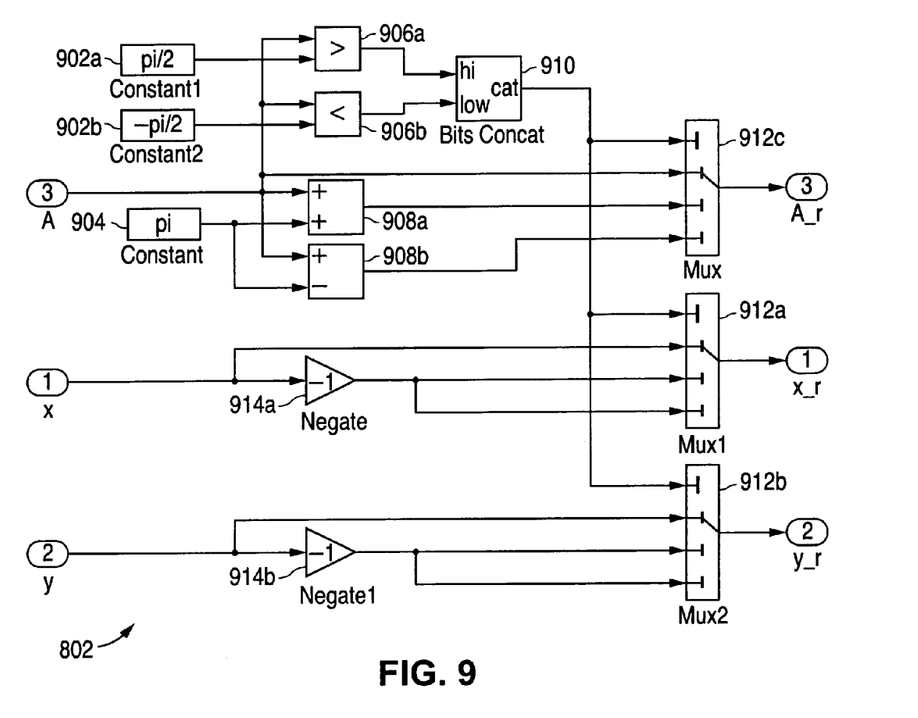
FIG. 9 shows an implementation of a CORDIC Rot Angle Remap module.
Figure 10:
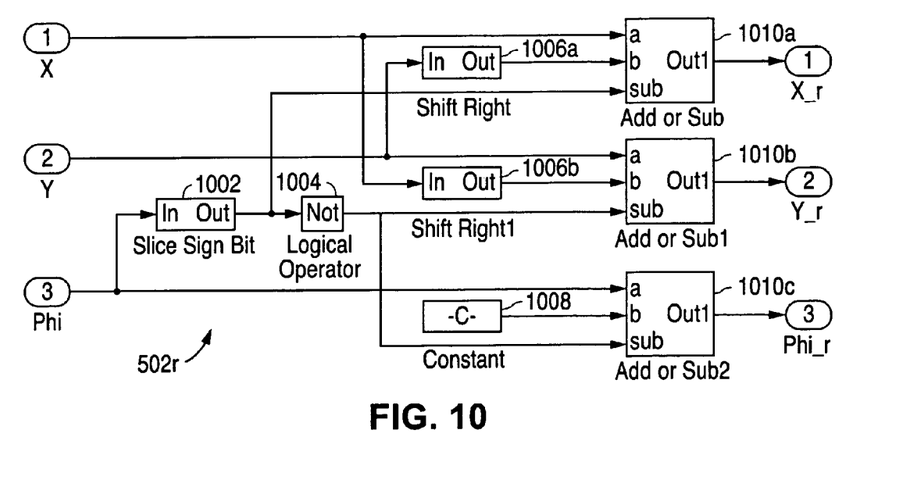
FIG. 10 shows an example implementation on one stage of the CORDIC Rot CORDIC Chain module.

FIGS. 8-10 show the detailed implementation of CORDIC Rot module 1304. FIG. 8 shows the top level view of the CORDIC Rot implementation 1304 which takes input coordinates x and y and the rotation angle A and outputs the rotated coordinates x_r and y_r. The Angle Remap module 802, whose implementation detail is shown in FIG. 9, remaps the angle rotation from the second and third quadrants to the first and fourth quadrants, respectively. The underlining structure of the CORDIC Chain 804 for CORDIC Rot 1304 is similar to that of the CORDIC Mag shown in FIG. 5. However, there are slight modifications for the implementation of each stage 502r of the chain as shown in FIG. 10. The direction of the rotation now depends on the sign of the remain angle ϕ rather than the vertical coordinate Y. As in CORDIC Rot, the final outputs are scaled by output scalers 808a, 808b to correct the intrinsic scaling of the rotation process.

Figure 11:
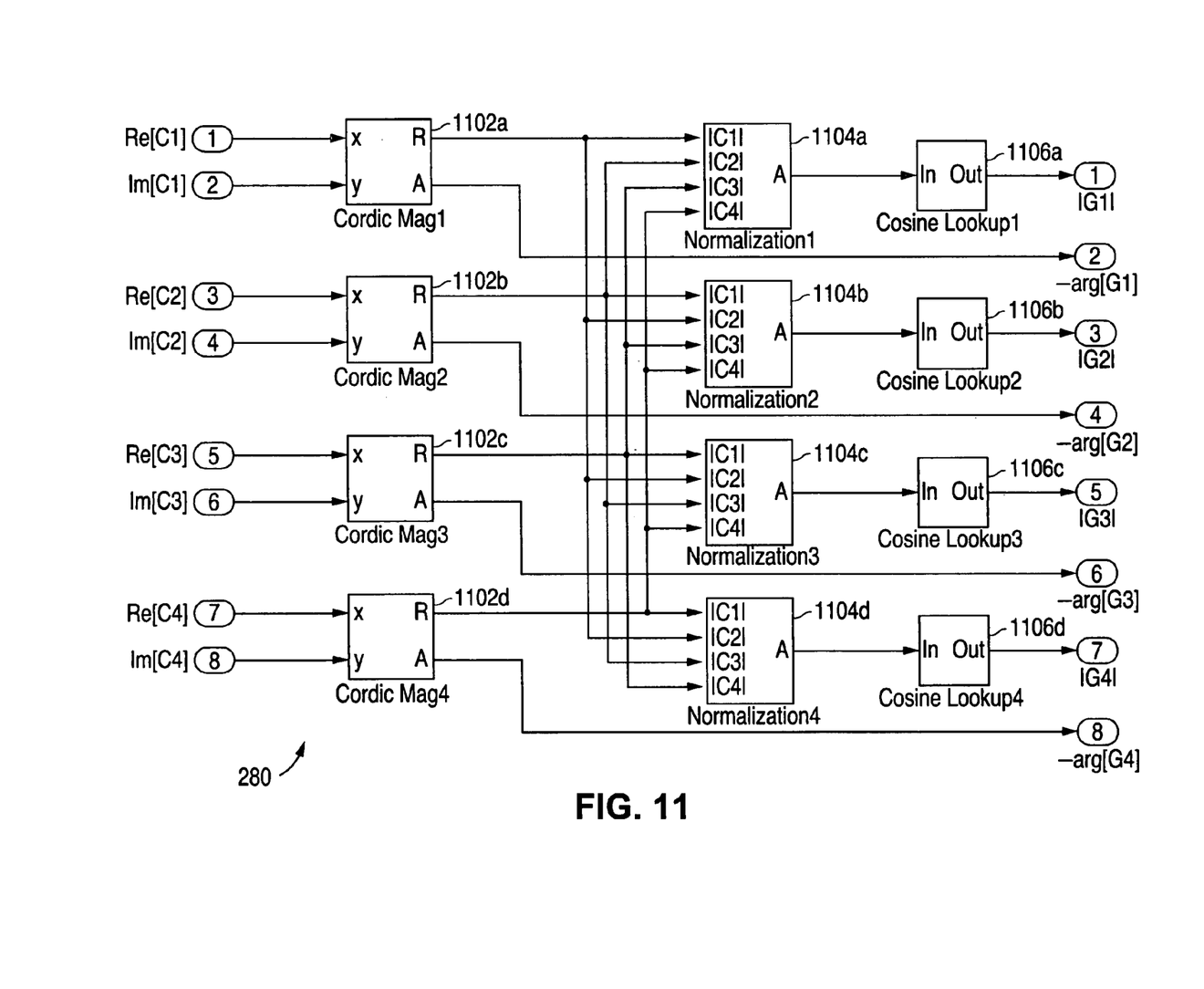
FIG. 11 shows a block-level implementation of a MISO Coefficient Computation module.

Now we describe a novel method of using the CORDIC Mag module 1102 to implement the MISO Coefficient Computation module 280 (FIG. 2) whose operation is described mathematically in Equation 1. The implementation is shown in FIG. 11 where we assume 4 antenna branches. The extension to more or less number of antenna branches is straightforward.

Instead of computing the Cartesian coordinates of $G_i(k)$, we will compute the Polar coordinates of the conjugate $$G_i^*(k) = \frac{C_i(k)}{\sqrt{|C_1(k)|^2 + |C_2(k)|^2 + |C_3(k)|^2 + |C_4(k)|^2}} \qquad (7)$$

Here i∈[1,4]. Referring to FIG. 11, the inputs to the MISO gain computation module are 4 pairs of Re[$C_i(k)$] and Im[$C_i(k)$], i.e., Cartesian coordinates of the channel frequency response coefficients 243a on subcarrier k from the antenna branches 106. Referring to FIG. 2, those coefficients 243a come from the Channel Estimation module 242. Inside the MISO Coefficient Computation module 280, the CORDIC Mag modules 1102a, 1102b, 1102c, 1102d compute the magnitudes $$|C_i(k)| = \sqrt{Re^2[C_i(k)] + Im^2[C_i(k)]} \qquad (8)$$

where i∈[1,4]. The angle of $C_i(k)$ is equal to the angle of $G_i^*(k)$ and thus the CORDIC Mag module angle outputs A are the angle outputs of the MISO Coefficient Computation module 280, i.e., −arg[$G_1(k)$] through −arg[$G_4(k)$].

Figure 12:
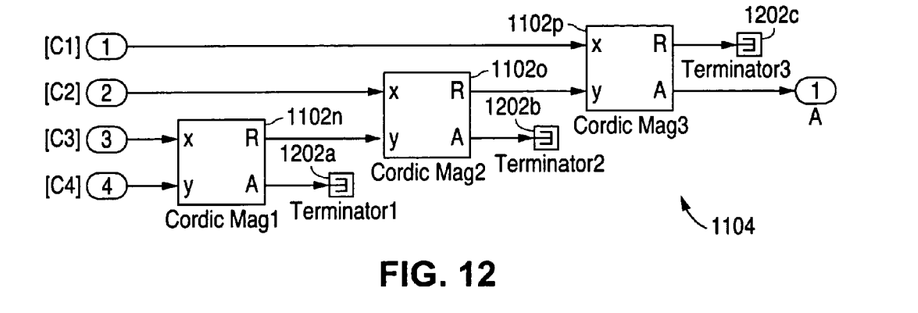
FIG. 12 shows an implementation of a MISO Coefficient Computation Normalization module.

The Normalization modules 1104 together with the Cosine Lookup modules 1106 compute the magnitude |$G_i^*(k)$| for the 4 antenna branches 106. FIG. 12 shows the implementation of the Normalization module 1104. In FIG. 12, CORDIC Mag1 1102n computes the magnitude $\sqrt{|C_3(k)|^2 + |C_4(k)|^2}$. CORDIC Mag2 1102o computes the magnitude $\sqrt{|C_2(k)|^2 + |C_3(k)|^2 + |C_4(k)|^2}$. The angle output of CORDIC Mag3 1102p is then $$\arccos\left[\frac{|C_1(k)|}{\sqrt{|C_1(k)|^2 + |C_2(k)|^2 + |C_3(k)|^2 + |C_4(k)|^2}}\right] \qquad (9)$$

By reordering the inputs to the Normalization modules 1104 we can then compute Equation 10 for any i∈[1,4] as shown in FIG. 11.

$$\arccos\left[\frac{|C_i(k)|}{\sqrt{|C_1(k)|^2 + |C_2(k)|^2 + |C_3(k)|^2 + |C_4(k)|^2}}\right] \qquad (10)$$

The Normalization module 1104 outputs after the Cosine lookups 1106 will generate the desired magnitudes $$|G_i^*(k)| = \frac{|C_i(k)|}{\sqrt{|C_1(k)|^2 + |C_2(k)|^2 + |C_3(k)|^2 + |C_4(k)|^2}} \quad (11)$$

for the antenna branches 106.

The complex conjugates of the MISO gain coefficients 243a will be stored in the MISO profile storage module 282. For IEEE 802.11a/g system, there are total of 64 subcarriers and for each subcarrier the 4 complex coefficients will be stored as 4 magnitude and angle pairs. We call MISO gain coefficients on all the subcarriers and antenna branches a MISO profile.

Figure 16:
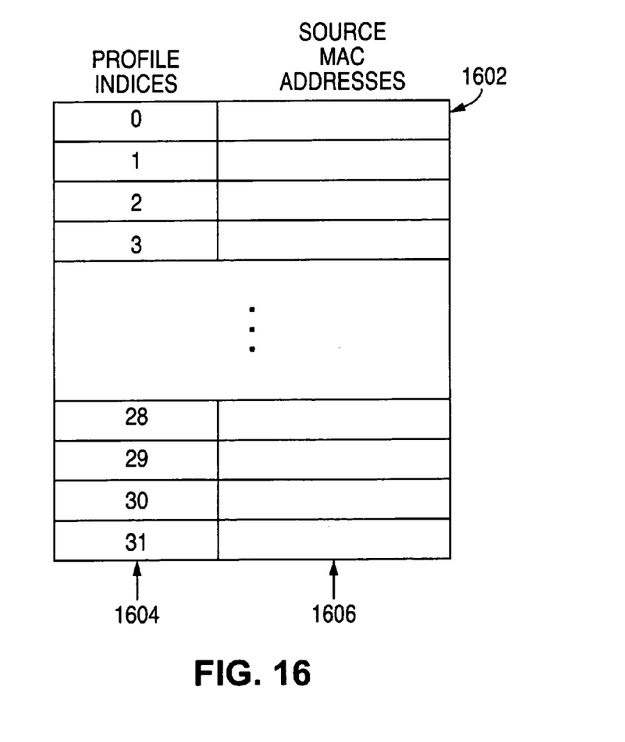
FIG. 16 depicts associations between MISO profile indices and SISO station MAC addresses.

The MISO Profile Storage module 282 will keep a bank of profiles, e.g., 32. The profiles are indexed, e.g., from 0 through 31. The MAC (Medium Access Control) unit 200m maintains an association table 1602, which associates a profile index 1604 with a MAC address 1606, as depicted in FIG. 16. The unused indices are associated with a NULL MAC address. Before a packet reception, the MAC unit 200m will pass an unused profile index 201 to the PHY 200r (the baseband blocks as implemented in FIG. 2). If the packet reception is a success (as indicated by a MAC CRC pass), the MAC unit 200m will associate the profile index with the packet source station 102 MAC address. For each transmission, the MAC unit 200m will check its MISO profile association table 1602 for the destination MAC address. If there is a valid profile associated with the destination MAC address, the profile will be used to scale the frequency domain data (as performed by the MISO Scaling module 220 in FIG. 2). When there is no valid profile associated with the destination MAC address, a default profile may be used, e.g., to enable one of the 4 antenna branches. A new profile from a source station 102 overwrites the profile already associated with the station MAC address 1606 in the association table 1602.

Due to memory constraints, only a limited number of profiles may be stored in the MISO Profile Storage 282. Software for the MAC unit 200m cleans up the association table 1602 periodically to ensure there are empty profiles for use by the PHY 200r for the next packet reception. Certain metrics may be used by the software to determine which user profiles to keep or delete upon an overflow, e.g., according to frequencies of use of specific MAC addresses.

Referring again to FIG. 2, the MISO Scaling module 220 uses the MISO gain coefficients 283 from the MISO Profile Storage 282 to scale the frequency-domain data from the Mapper 210. The scaling operation is expressed in Equation 2 which we rewrite as $$X_i(k) = G_i(k)X(k) = |G_i(k)|e^{-j(-\arg[G^{i(k)}])}X(k) \quad (12)$$

Figure 13:
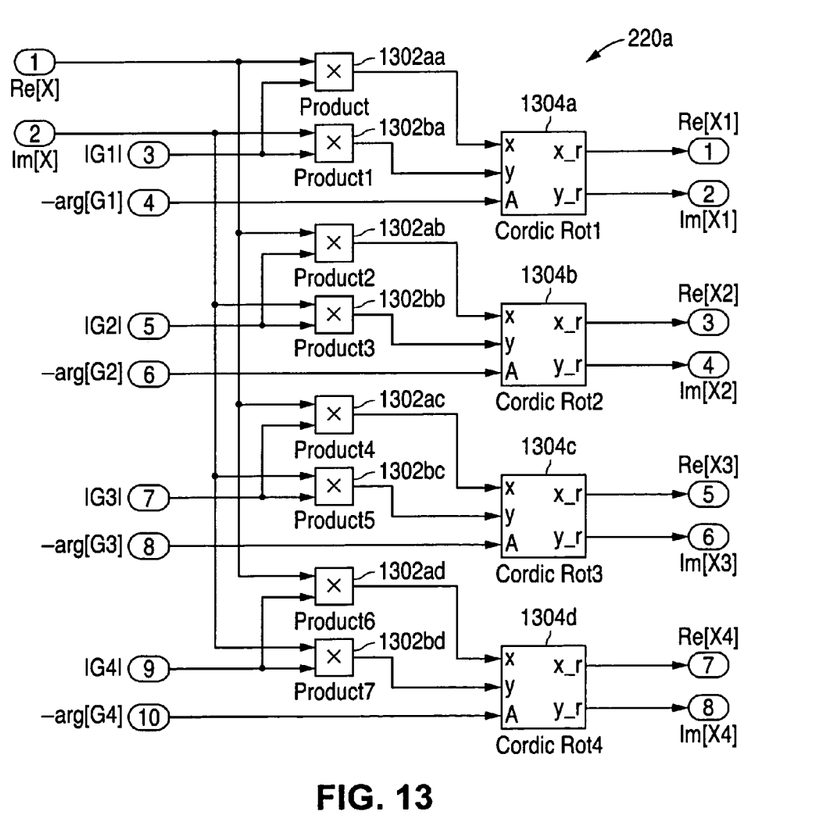
FIG. 13 shows an implementation of a MISO Scaling module.

FIG. 13 shows the implementation of the MISO Scaling module 220. For each antenna branch 106, the scaling module 220a uses two real multipliers 1302a, 1302b to implement the multiplication of the magnitude $|G_i(k)|$, and a CORDIC Rot module 1304 to implement the multiplication of the phase factor $e^{-(-\arg[G_i(k)])}$. The scaled frequency domain data are then passed through IFFT (inverse fast Fourier transformation) modules 212 to generate the time-domain signal waveforms on different antenna branches 106.

Figure 14:
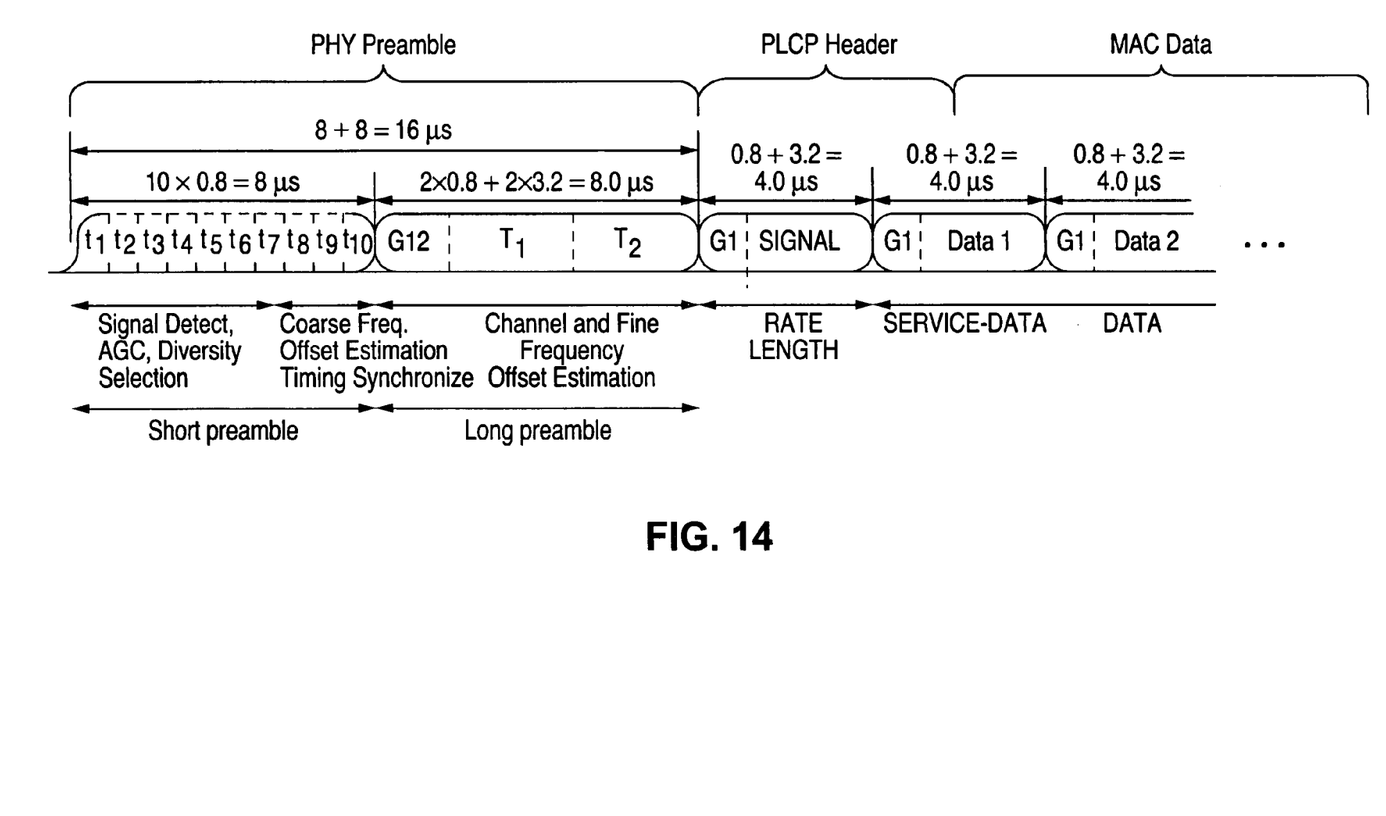
FIG. 14 shows a detailed PHY-layer packet structure for IEEE 802.11a/g.

In most IEEE 802.11a/g implementations, the PHY preamble is usually stored as time-domain waveform (referring to FIG. 14 for an IEEE 802.11a/g packet structure). There are two reasons for this. First, the preamble is fixed frequency domain data and has a fixed time-domain waveform. Second, because of IEEE 802.11 MAC SIFS (Short Inter-Frame Spacing) timing constraints, it is advantageous to put the preamble in the time domain so that once a MAC unit 200m requests a transmission, the preamble can be sent to the RF front-end right away, since otherwise, a preamble in the frequency domain will experience delay through the IFFT module 212 (referring to FIG. 2 transmit path).

Figure 15:
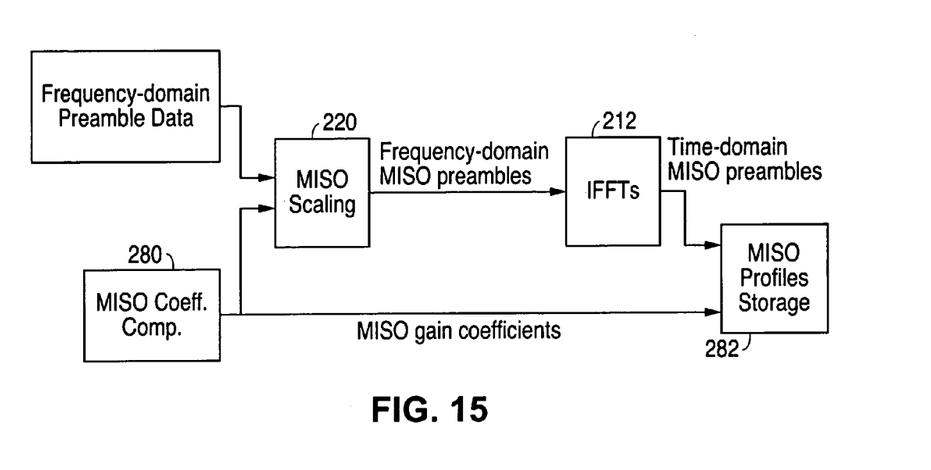
FIG. 15 illustrates the pre-computation of MISO preambles.

Referring to FIG. 15, for MISO operation, MISO gain scaling also needs to be performed on the frequency domain preamble data since the preamble is an integral part of a packet which will be used by the receiver to perform various parameter and channel estimations. One way to perform preamble scaling without using part of the MAC transmit timing budget is to pre-compute the preamble time-domain waveform during a packet reception. In other words, once the MISO gain coefficients are available in the reception process, they can be used to scale the frequency-domain preamble data right away. The scaling can be similarly performed by the MISO Scaling module 220. The scaled frequency-domain preambles are then passed through IFFT modules 212 to generate the corresponding time-domain preamble waveforms. These time-domain waveforms are stored in the MISO profile 282 along with the MISO coefficients. During transmission, the time-domain preambles are sent out directly to the RF front-ends without passing through IFFT modules 212.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

The invention claimed is:

1. An apparatus for generating signal gain coefficients for a single-input-multiple-output/multiple-input-single-output (SIMO/MISO) transceiver for providing packet data communication with a single-input-single-output (SISO) transceiver, comprising:

a plurality of signal terminals for conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver;

input coordinate rotation digital computation (CORDIC) circuitry coupled to said plurality of signal terminals and responsive to said plurality of input signals by providing a plurality of input magnitude signals and a plurality of input phase signals representing pluralities of magnitudes and phases, respectively, of polar coordinates for said plurality of receiver channel gain coefficients; and normalization circuitry coupled to said input CORDIC circuitry and responsive to at least a portion of said plurality of input magnitude signals by providing a plurality of normalized signals representing a plurality of normalized magnitudes of said polar coordinates for said plurality of receiver channel gain coefficients.

2. The apparatus of claim 1, wherein said input CORDIC circuitry comprises:

quadrant mapping circuitry responsive to said plurality of input signals by providing first and second pluralities of mapped signals, wherein respective ones of said plurality of input signals having phases between $\pi/2$ and $\pi$ radians and phases between $\pi$ and $3\pi/2$ radians are mapped to corresponding ones of said first plurality of mapped signals with phases between 0 and $\pi/2$ radians and phases between $3\pi/2$ and $2\pi$ radians, respectively;

CORDIC chain circuitry coupled to said quadrant mapping circuitry and responsive to said first plurality of mapped signals by providing said plurality of input magnitude signals and a plurality of mapped phase signals representing phases for respective ones of said first plurality of mapped signals; and quadrant remapping circuitry coupled to said quadrant mapping circuitry and said CORDIC chain circuitry, and responsive to said second plurality of mapped signals and said plurality of mapped phase signals by providing said plurality of input phase signals, wherein respective ones of said plurality of mapped phase signals corresponding to respective ones of said plurality of input signals having phases between $\pi/2$ and $\pi$ radians and phases between $\pi$ and $3\pi/2$ radians are remapped to respective ones of said plurality of input phase signals with phases between $\pi/2$ and $\pi$ radians and phases between $\pi$ and $3\pi/2$ radians, respectively.

3. The apparatus of claim 2, wherein said quadrant mapping circuitry comprises:

polarity sensing circuitry responsive to said plurality of input signals by providing said second plurality of mapped signals, wherein first and second portions of said second plurality of mapped signals represent polarities associated with respective ones of said first X- and Y-coordinates; and polarity conversion circuitry coupled to said polarity sensing circuitry and responsive to said plurality of input signals and said first portion of said second plurality of mapped signals by inverting respective ones of said plurality of input signals representing negative X-coordinates for said plurality of receiver channel gain coefficients to provide said first plurality of mapped signals.

4. The apparatus of claim 2, wherein said CORDIC chain circuitry comprises a plurality of successively coupled CORDIC stages each of which includes:

logic circuitry responsive to pluralities of input X- and Y-coordinate signals by providing pluralities of delayed X- and Y-coordinate signals and a plurality of control signals; and combining circuitry coupled to said logic circuitry and responsive to said pluralities of input X- and Y-coordinate signals, said pluralities of delayed X- and Y-coordinate signals, said plurality of control signals, and one or more input phase rotation signals by selectively adding and subtracting said pluralities of input X- and Y-coordinate signals, said pluralities of delayed X- and Y-coordinate signals, and said one or more input phase rotation signals to provide pluralities of output X- and Y-coordinate signals and a plurality of output phase rotation signals.

5. The apparatus of claim 2, wherein said quadrant remapping circuitry comprises:

phase selection circuitry responsive to a first portion of said second plurality of mapped signals by selecting among said first plurality of phase signals and a plurality of phase shift signals to provide said plurality of input phase signals, wherein said first portion of said second plurality of mapped signals represents polarities associated with respective ones of said first X-coordinates; and phase shift circuitry coupled to said phase selection circuitry and responsive to said plurality of mapped phase signals and a second portion of said second plurality of mapped signals by providing said plurality of phase shift signals, wherein said second portion of said second plurality of mapped signals represents polarities associated with respective ones of said first Y-coordinates, and said plurality of phase shift signals represents selectively shifted phases for respective ones of said first plurality of mapped signals.

6. The apparatus of claim 1, wherein said normalization circuitry comprises a plurality of successively coupled stages each of which includes:

quadrant mapping circuitry responsive to a plurality of Cartesian coordinate signals representing a plurality of Cartesian coordinates by providing first and second pluralities of mapped signals, wherein respective ones of said plurality of Cartesian coordinate signals having phases between $\pi/2$ and $\pi$ radians and phases between $\pi$ and $3\pi/2$ radians are mapped to corresponding ones of said first plurality of mapped signals with phases between 0 and $\pi/2$ radians and phases between $3\pi/2$ and $2\pi$ radians, respectively;

CORDIC chain circuitry coupled to said quadrant mapping circuitry and responsive to said first plurality of mapped signals by providing a plurality of magnitude signals representing a plurality of magnitudes of polar coordinates corresponding to said plurality of Cartesian coordinates, and a first plurality of phase signals representing phases for respective ones of said first plurality of mapped signals; and quadrant remapping circuitry coupled to said quadrant mapping circuitry and said CORDIC chain circuitry, and responsive to said second plurality of mapped signals and said first plurality of phase signals by providing a second plurality of phase signals representing a plurality of phases of said polar coordinates.

7. The apparatus of claim 6, wherein said normalization circuitry further comprises cosine lookup table circuitry coupled to said quadrant remapping circuitry of a last one of said plurality of successively coupled stages.

8. The apparatus of claim 1, wherein said pluralities of normalized and input phase signals together correspond to a plurality of transmitter channel gain coefficients each one of which corresponds to a normalized inverse of a respective one of said plurality of receiver channel gain coefficients for use in producing a plurality of outgoing RF signals to be transmitted via said plurality of spatially diverse antenna elements for reception by said particular SISO RF transceiver.

9. The apparatus of claim 1, further comprising scaling circuitry coupled to said input CORDIC circuitry and said normalization circuitry, and responsive to a plurality of outgoing data signals, at least a portion of said plurality of input phase signals and at least a portion of said plurality of normalized signals by providing a plurality of scaled data signals.

10. An apparatus for generating signal gain coefficients for a single input-multiple-output/multiple-input-single-output (SIMO/MISO) transceiver for providing packet data communication with a single-input-single-output (SISO) transceiver, comprising:

signal means for conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver;

input coordinate rotation digital computer (CORDIC) means for responding to said plurality of input signals by generating a plurality of input magnitude signals and a plurality of input phase signals representing pluralities of magnitudes and phases, respectively, of polar coordinates for said plurality of receiver channel gain coefficients; and normalizing means for responding to at least a portion of said plurality of input magnitude signals by generating a plurality of normalized signals representing a plurality of normalized magnitudes of said polar coordinates for said plurality of receiver channel gain coefficients.

11. The apparatus of claim 10, further comprising scaling means for responding to a plurality of outgoing data signals, at least a portion of said plurality of input phase signals and at least a portion of said plurality of normalized signals by generating a plurality of scaled data signals.

12. A method of generating signal gain coefficients for a single-input-multiple-output/multiple-input-single-output (SIMO/MISO) transceiver for providing packet data communication with a single-input-single-output (SISO) transceiver, comprising:

conveying a plurality of input signals representing first Cartesian coordinates X, Y for a plurality of receiver channel gain coefficients corresponding to relative signal strengths of respective ones of a plurality of incoming radio frequency (RF) signals received via a plurality of spatially diverse antenna elements and corresponding to a wireless data signal originating from a particular SISO RF transceiver;

performing coordinate rotation digital computation in response to said plurality of input signals to generate a plurality of input magnitude signals and a plurality of input phase signals representing pluralities of magnitudes and phases, respectively, of polar coordinates for said plurality of receiver channel gain coefficients; and responding to at least a portion of said plurality of input magnitude signals by generating a plurality of normalized signals representing a plurality of normalized magnitudes of said polar coordinates for said plurality of receiver channel gain coefficients.

13. The method of claim 12, wherein said performing coordinate rotation digital computation in response to said plurality of input signals to generate a plurality of input magnitude signals and a plurality of input phase signals representing pluralities of magnitudes and phases, respectively, of polar coordinates for said plurality of receiver channel gain coefficients comprises:

responding to said plurality of input signals by generating first and second pluralities of mapped signals, wherein respective ones of said plurality of input signals having phases between $\pi/2$ and $\pi$ radians and phases between $\pi$ and $3\pi/2$ radians are mapped to corresponding ones of said first plurality of mapped signals with phases between 0 and $\pi/2$ radians and phases between $3\pi/2$ and $2\pi$ radians, respectively;

performing coordinate rotation digital computation in response to said first plurality of mapped signals to generate said plurality of input magnitude signals and a plurality of mapped phase signals representing phases for respective ones of said first plurality of mapped signals; and responding to said second plurality of mapped signals and said plurality of mapped phase signals by generating said plurality of input phase signals, wherein respective ones of said plurality of mapped phase signals corresponding to respective ones of said plurality of input signals having phases between $\pi/2$ and $\pi$ radians and phases between $\pi$ and $3\pi/2$ radians are remapped to respective ones of said plurality of input phase signals with phases between $\pi/2$ and $\pi$ radians and phases between $\pi$ and $3\pi/2$ radians, respectively.

14. The method of claim 12, wherein said responding to at least a portion of said plurality of input magnitude signals by generating a plurality of normalized signals representing a plurality of normalized magnitudes of said polar coordinates for said plurality of receiver channel gain coefficients comprises successively:

responding to a plurality of Cartesian coordinate signals representing a plurality of Cartesian coordinates by generating first and second pluralities of mapped signals, wherein respective ones of said plurality of Cartesian coordinate signals having phases between $\pi/2$ and $\pi$ radians and phases between $\pi$ and $3\pi/2$ radians are mapped to corresponding ones of said first plurality of mapped signals with phases between 0 and $\pi/2$ radians and phases between $3\pi/2$ and $2\pi$ radians, respectively;

performing coordinate rotation digital computation in response to said first plurality of mapped signals by generating a plurality of magnitude signals representing a plurality of magnitudes of polar coordinates corresponding to said plurality of Cartesian coordinates, and a first plurality of phase signals representing phases for respective ones of said first plurality of mapped signals; and responding to said second plurality of mapped signals and said first plurality of phase signals by generating a second plurality of phase signals representing a plurality of phases of said polar coordinates.

15. The method of claim 12, wherein said pluralities of normalized and input phase signals together correspond to a plurality of transmitter channel gain coefficients each one of which corresponds to a normalized inverse of a respective one of said plurality of receiver channel gain coefficients for use in producing a plurality of outgoing RF signals to be transmitted via said plurality of spatially diverse antenna elements for reception by said particular SISO RF transceiver.

16. The method of claim 12, further comprising scaling a plurality of outgoing data signals to produce a plurality of scaled data signals in response to at least a portion of said plurality of input phase signals and at least a portion of said plurality of normalized signals.

* * * * *